(No Model.)
E. GALE.
TROLLEY WIRE FINDER.
No. 513,566. Patented Jan. 30, 1894.
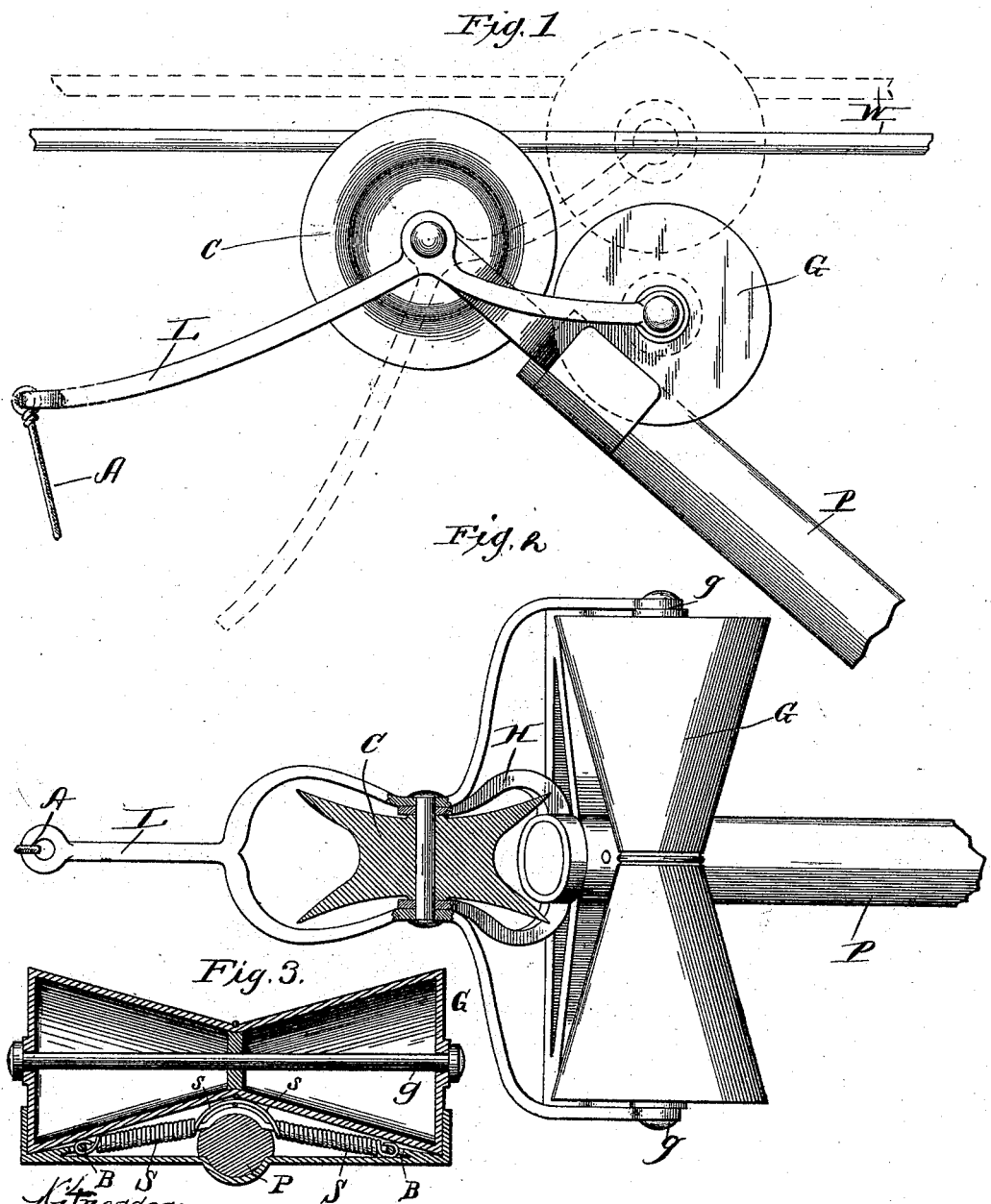

UNITED STATES PATENT OFFICE.

EDWARD GALE, OF PEORIA, ILLINOIS.

TROLLEY-WIRE FINDER.

SPECIFICATION forming part of Letters Patent No. 513,566, dated January 30, 1894.

Application filed November 21, 1892. Serial No. 452,677. (No model.)

*To all whom it may concern:*

Be it known that I, EDWARD GALE, a citizen of the United States of America, residing at Peoria, in the county of Peoria and State of Illinois, have invented certain new and useful Improvements in Trolley-Wire Finders, of which the following is a specification.

Referring to the accompanying drawings, wherein like reference-letters indicate like parts—Figure 1. is a side elevation; Fig. 2. a top plan, with section of wheel; Fig. 3. a section of guard.

As trolleys have been heretofore constructed, the accidental disconnection of the contact wheel from the line wire has been liable to injure the wire, to interrupt the circuit and leave the car unmanageable, and to involve more or less delay and trouble in re-establishing the contact.

The object of my invention is to so improve the old construction as to prevent the evils referred to.

To this end, my invention consists, broadly, in providing the trolley pole with a guard or projection which, through the springing of the pole, will engage with the line wire whenever the contact wheel disengages therefrom, and thus prevent the pole from being thrown violently upward and injuring the line wire or guy wires.

It consists, secondly, in including said guard or projection in the pole circuit connection, so that the current, when broken by the line wire leaving the contact wheel, will be immediately restored by the wire lodging against the guard or projection.

It consists, thirdly, in a movable guard, adapted to raise the line wire and replace it upon the contact wheel.

It further consists in the subordinate combinations and devices more specifically pointed out in the claims therefor.

Form is not essential to the invention, as my several improvements may be carried into practice in a great variety of forms of apparatus, three of which are illustrated in the drawings.

Referring to the three forms of embodiment:
In Figs. 1, 2, and 3. W. indicates the line wire; P. the trolley pole; C. the contact wheel; and H. the "harp" or bifurcated support of the contact-wheel. The circuit is established through the contact-wheel, harp, and trolley pole, to the motor, in the usual manner, and need not be illustrated, as its devices form no part of my invention. G. is the guard, which constitutes the main feature of my invention. In the preferable form here shown, it consists of a roller or spool, tapering from each end to the middle, mounted loosely on a shaft or two studs *g. g.*, and extending transversely across the trolley pole near the wheel C. and below the line wire. The ends of this guard project beyond the vertical planes of the sides of the wheel C., so that whenever the latter wheel accidentally leaves the line wire, the spring of the pole will throw the guard up against the wire, arresting the upward movement of the pole before it can do any damage. The length of the guard or spool is not material, provided it be long enough to catch the line wire, and not long enough to be too heavy or cumbersome. It is better to allow the spool or guard to revolve on its bearings, to prevent wearing the line wire when in contact with it. To enable the current to pass through the spool or guard to the motor, it is only necessary to have a metallic connection from the surface of the spool or guard to the harp or to any part of the circuit connection of the wheel C.—for example, by making the guard of metal, and running its supporting arms to the shaft or journal of the wheel, as shown in Figs. 1. and 2. Then, whenever the wheel C. leaves the line wire and the guard catches the wire, the current, momentarily interrupted, will be instantly restored to the motor. To enable the guard to be used as a means for restoring contact between the line wire and the wheel C., it is only necessary to adapt the guard to be moved, at the will of the attendant, in such a way as to raise the line wire and drop it into the groove of the wheel. A preferable means for doing this is shown, consisting in mounting the guard on a lever L., fulcrumed on the journals of the wheel C., and providing a cord A. or equivalent device extending from the outer end of the lever to some convenient point where the attendant can reach it. By pulling on the cord, the lever and guard will be brought to the position shown in dotted lines in Fig. 1., the line wire will then slide down the inclines to the middle of the guard, where it will lie directly above the groove of the wheel, and upon releasing the cord, the wire will drop into said groove and re-establish the normal contact. I prefer to employ a spring to restore the guard to its normal position, and to hold it there; and, for this purpose, the spring may be applied in any suitable way, for example, as shown in Fig. 3., where it is shown at S. as a coiled spring attached at each end to a bar or plate B., secured to the pole at the side of the guard—said spring having at its middle a bow s. extending around the middle of the guard in a groove provided to receive it. The spring thus arranged will restore it to its normal position when the operating cord is released.

It is obvious that various modifications of my improved device may be made, without departing from the spirit of my invention, and which will operate in a more or less satisfactory manner. I therefore do not wish to be understood as limiting myself to the exact form shown.

Having thus described my invention, what I claim as new, and desire to secure by Letters Patent, is—

1. The combination of the trolley-pole and wheel, with a revoluble guard extending laterally beyond the vertical planes of the sides of the wheel; substantially as described.

2. The combination of the trolley-pole and wheel, with a guard or finder, mounted on the pole near the wheel, said guard having mounted thereon a revoluble sleeve extending laterally beyond the vertical planes of the sides of the wheels and being movable vertically with relation to the wheel; substantially as described.

3. The combination of the trolley-pole and wheel with a revoluble finder-spool near the wheel, extending laterally beyond the vertical planes of the sides of the wheel, and mounted on lever-arms pivoted to or in line with the journals of said wheel; substantially as described.

4. The combination of the trolley-pole or wheel with a guard or finder supported by the pole, near the wheel, and having mounted thereon a revoluble sleeve extending laterally beyond the vertical planes of the sides of the wheel, and having its surface in electrical communication with the circuit connections between the wheel and the motor; substantially as described.

5. The combination of the trolley-pole and wheel, with a guard or finder having mounted thereon a revoluble sleeve with inclined surfaces extending laterally beyond the vertical planes of the sides of the wheel, and with means for raising the guard to replace the wire into contact with the wheel; substantially as described.

6. The combination of the trolley-pole and wheel, with a guard or finder having mounted thereon a revoluble sleeve with inclined surfaces extending laterally beyond the vertical planes of the sides of the wheel, and supported upon a lever, whereby, by rocking the lever on its fulcrum the guard can be raised in order to raise the line wire and replace it into contact with the wheel; substantially as described.

7. The combination of the trolley-pole or wheel, with a guard or finder, having mounted thereon a revoluble sleeve with inclined surfaces extending laterally beyond the vertical planes of the sides of the wheel, and with means for raising said guard to replace the line wire into contact with the wheel, and with a spring to restore the guard to its normal position; substantially as described.

8. The combination of the trolley-pole and wheel, with a guard or finder supported by the pole near the wheel having mounted thereon a revoluble sleeve with inclined surfaces, extending laterally beyond the vertical planes of the sides of the wheel to catch the line wire in case it should become disconnected from the wheel; substantially as described.

9. In a trolley, the combination of the grooved contact-wheel C, with the revoluble finder spool G extending laterally beyond the vertical sides of the contact-wheel; substantially as described.

10. In a trolley, the combination of the grooved contact-wheel C, and the revoluble finder spool G; extending laterally beyond the vertical sides of the contact-wheel with the lever L, supporting the guard and fulcrumed to the harp H, with the cord A, for controlling the guard; substantially as described.

EDWARD GALE.

In presence of—
JOHN S. STEVENS,
WALTER S. HORTON.